May 15, 1951 R. E. JOHNSON 2,552,974
WHEEL ELEVATING ATTACHMENT FOR VEHICLE HOISTS
Filed Jan. 21, 1948

Inventor
ROY E. JOHNSON

By Williamson & Williamson
Attorneys

Patented May 15, 1951

2,552,974

UNITED STATES PATENT OFFICE 2,552,974

WHEEL ELEVATING ATTACHMENT FOR VEHICLE HOISTS

Roy E. Johnson, Minneapolis, Minn.

Application January 21, 1948, Serial No. 3,614

7 Claims. (Cl. 254—89)

This invention relates to attachment accessories for vehicle hoists and the like and particularly to an attachment mechanism for elevating certain wheels of the vehicle above the hoist platform.

The modern vehicle hoists as used in filling stations and garages provide a controllably raisable platform on to which the vehicle is initially run and thereafter the hoist platform is raised to elevate the vehicle to permit working on the under parts thereof; the platform obstructs access to certain parts of the vehicle. Also in the greasing of automobiles it is desirable both to rotate the vehicle wheels and to turn the wheels which steer the vehicle to get the grease properly worked into the parts during the greasing operation as well as to afford free accessibility to all of the parts to be greased.

Therefore, it is an object of my invention to provide a novel and improved highly efficient mechanism adapted to be attached to vehicle hoists and the like for elevating certain wheels of the vehicle above the hoist platform to permit free accessibility to all the under parts of the vehicle as well as to aid in the efficient greasing of the vehicle by permitting elevated wheels to be freely rotated and turned on their steering connections.

More specifically it is an object to provide a mechanism adapted to be attached to the platform of a vehicle hoist and having at least one vertically slidable element adapted to engage and support the wheel carrying member of said vehicle and to cooperate with the vehicle hoist to raise said wheel carrying member and the wheel carried thereby and having stop means for supporting said wheel in raised position to hold the same above the platform of the hoist.

These and other objects and advantages of my invention will more fully appear from the following description made in connection with the accompanying drawings wherein like reference characters refer to similar parts throughout the several views and in which.

Figure 1:
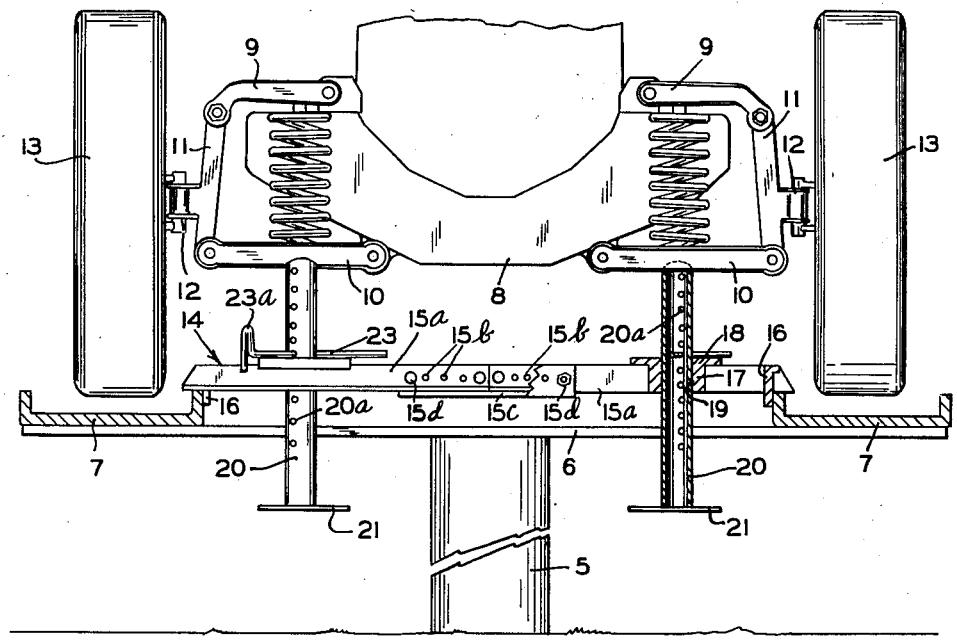
Fig. 1 is a transverse vertical sectional view showing my attachment mounted in operative position on a vehicle hoist to hold the wheels of a vehicle above the hoist platform.
Figure 2:
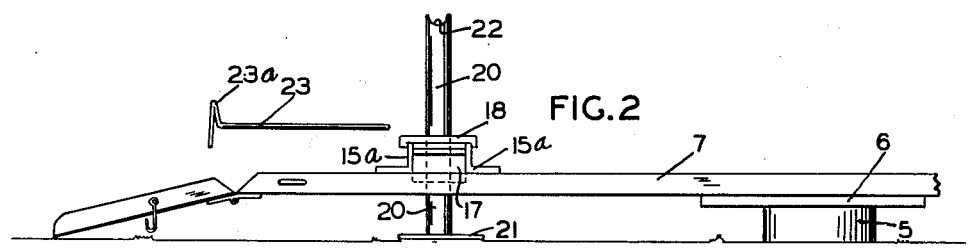
Fig. 2 is a side elevational view of a vehicle hoist platform showing my wheel elevating attachment mounted thereon.

As illustrated in Figs. 1 and 2 of the accompanying drawings I provide a wheel elevating attachment for a conventional hoist such as the hydraulic hoist having the central hoist piston 5 with the platform supporting frame 6 fixed at the top thereof. A vehicle carrying platform formed by a pair of longitudinal disposed spaced parallel elongated channels or tracks 7 is fixed to said frame 6 and is supported thereby. The front end of a conventional automobile having independently sprung front wheels is illustrated in Fig. 1. The automobile has a transverse frame member 8 with upper wheel supporting arms 9 pivotally connected thereto and lower wheel supporting arms 10 pivotally connected in spaced relation below the respective upper arms 9. A pair of spindle supports 11 respectively connect adjacent pairs of upper and lower arms 9 and 10 and respectively carry a pair of front wheel spindles 12. The vehicle has a pair of front wheels 13 journaled respectively on said spindles 12 which permit turning of the wheels 13 for steering the vehicle and which also permits rotation of the wheels 13.

Figure 3:
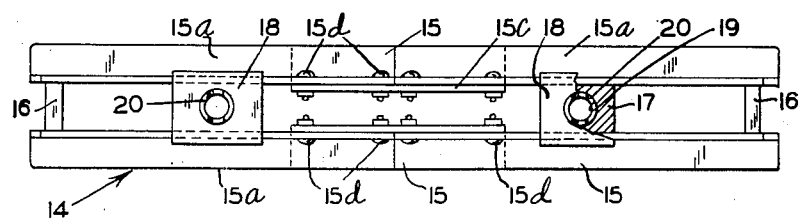
Fig. 3 is a top plan view of my wheel elevating attachment.

A jack carriage or bridge designated as an entirety by the numeral 14; it is best shown in Fig. 3. The carriage 14 has a pair of extensible cross members 15 each formed as from a pair of aligned angles 15a which can be abutted at their inner ends or disposed with their inner ends in adjustably spaced relation the inner end portions of each of the angle bars 15a as a plurality of longitudinal spaced apertures 15b formed in the upstanding leg thereof, a pair of connector angle bars 15c having similarly spaced cooperating apertures formed therein respectively connects each aligned thereof angles 15a. A pair of bolts 15d connects each angle bar 15a with connector angle 15c to form a rigid connection, and this connection may be adjusted to permit the carriage 14 to be mounted on various platforms having different spacing between the channels 7 so as to fit all of the conventional hoists and be mounted thereon. A pair of cross struts 16 respectively interconnect the outer end portions of angles 15a and are disposed in inwardly spaced relation from the outer end extremities of said angles 15a which slidably engage the top of the inner flanges of the channels 7 to be supported thereon. The lower portions of struts 16 extend respectively below adjacent portions of angles 15a to slidably abut the inner surfaces of the upstanding flanges of the wheel engaging channels 7 to form stops to prevent the outer end portions of the angles 15a from sliding laterally of the vehicle and falling down between the channels 7 during adjustment thereof.

A pair of solid blocks 17 are interposed between intermediate portions of cross members 15 in slidable relation thereto and have a pair of supporting flange plates 18 fixed to the top thereof as by being welded thereto as best shown in Fig. 1. A pair of jack receiving apertures 19 are respectively formed through said plates 18 and blocks 17 to permit a vertically disposed elongated tubular jack member 20 to be slidably mounted therein. The lower extremities of each of the jack members 20 has a base formed thereon such as the base plates 21 fixed thereto. As best shown in Fig. 2 the upper extremity of jack member 20 has an axle receiving element such as a notch or recess 22 formed therein. The intermediate portions of the jack members 20 have a plurality of vertically spaced horizontally disposed apertures 20a drilled therethrough and these apertures 20a are adapted to selectively receive a load carrying pin 23 with a gripping element 23a formed at one end thereof. The block 17 and plate 18 with aperture 19 formed therein forms a sleeve in which the respective jack member 20 is free to slide when the pin 23 is removed therefrom, the lower portion of the jack members 20 extending downwardly below the hoist frame 6 and channel 7 to permit the base plates 21 to engage the floor surface below the hoist.

The following is a description of the operation of my improved and highly simplified wheel elevating attachment for vehicle hoists. The vehicle is initially driven onto the platform with its wheels 13 respectively engaging the channels 7. The carriage or bridge 14 may be already set in place on the channel 7 or may be slid thereon after the vehicle has been stopped and the hoist raised slightly. In either event, however, the hoist must be in raised position to permit the placing of the jack members 20 with their recesses respectively disposed below portions of the vehicle axle to be engaged therein. The jack members 20 are shifted upwardly so that the axle engaging elements 22 respectively engage the lowerarms 10 of the knee action system illustrated in Fig. 1. It should be noted that wherever "axle" is referred to in this specification and the following claims that it is intended to include the old type conventional axle as well as any other wheel carrying member of a vehicle. The pins 23 are inserted into one of the apertures 20a to support the said jack members during the lowering of the hoist to abut the base plates 21 against the floor surface. The subsequent lowering of the hoist with the axle engaging elements 22 respectively engaged against axle elements 10 raises said axle elements 10 and said wheels 13 off the channels 7 when the desired elevation of the wheels 13 above channels 7 is obtained the supporting pins 23 are removed from the aperture in which they reside and inserted into a lower aperture where they are to abut the top surface of plate 18 and support the entire weight of the front end of the vehicle. The blocks 17 may be slid laterally of the vehicle to properly position the axle engaging elements for engagement with the axle as well as sliding the carriage 14 longitudinally of said channels 7. The hoist platform is now ready to be raised with the wheels elevated above the channels 7 to permit the wheels to be turned on spindles 12 as well as to permit said wheels 13 to be rotated during the subsequent servicing of the vehicle. The attachment herein illustrated may also be used to elevate the rear end of the vehicle if it is found that this is desirable.

It will be seen that I have provided an extremely simple, highly efficient wheel elevating attachment for conventional hoists which due to the adjustably extensible cross arms can be mounted on any of these hoists even though the widths thereof are not all equal. By using the floor surface and the sliding jack member within a sleeve I provide a simplified construction which is very inexpensive to manufacture and which has no independent source of elevating power. This materially reduces the original cost as well as the maintenance cost and only the elevating power of the vehicle hoist is used to operate my improved mechanism.

It will, of course, be understood that various changes may be made in the form, details, arrangement and proportions of the parts without departing from the scope of my invention.

What I claim is:

1. A wheel elevating attachment for vehicle hoists of the type having a raisable vehicle carrying platform, said attachment comprising as essential elements only a pair of axle supporting members adapted to be carried by said platform in vertically slidable relation thereto and each having an axle receiving element at the top thereof and adapted to be placed under a vehicle axle when the hoist platform is slightly elevated with a vehicle carried thereon, at least one ground engaging element connected to said axle supporting members and having a portion thereof normally disposed below the hoist platform, said ground engaging element abutting the ground surface when said hoist platform is subsequently lowered, whereby said axle receiving elements are projected upwardly into engagement with the axle of a vehicle carried on said platform to raise said axle and elevate the wheels of the vehicle above the hoist platform, and means for securely retaining said axle receiving elements in upwardly projected position to hold said vehicle wheels in elevated position.

2. A wheel elevating attachment for vehicle hoists of the type having a raisable vehicle carrying platform, said attachment comprising as essential elements only a pair of vertically disposed elongated jack members adapted to be carried by said platform in vertically slidable relation thereto and having a portion thereof normally extending therebelow and respectively having a pair of axle receiving elements at the top of said jack members and adapted to be placed under the axle of a vehicle when the hoist platform is slightly raised with a vehicle carried thereon, ground engaging elements respectively fixed at the bottom of said jack members, said ground engaging elements abutting the ground surface when said hoist platform is subsequently lowered, to shift said jack members upwardly and project said axle receiving elements against the vehicle axle to raise the same and elevate the wheels thereof above the hoist platform, and means for retaining said jack elements in upwardly shifted position to hold said vehicle wheels in elevated position.

3. A wheel elevating attachment for vehicle hoists of the type having a raisable vehicle carrying platform, said attachment comprising a carriage adapted to be mounted on said hoist platform for horizontal shifting thereon longitudinally thereof, a pair of vertically disposed elongated jack members mounted on said carriage in vertically slidable relation thereto and having a portion thereof normally extending below said platform, axle receiving elements respectively at the top of said jack members and adapted to be initially placed below the axle of a vehicle carried on said hoist platform when said platform is in slightly raised position, ground engaging elements respectively fixed at the bottom of said jack members and adapted to abut the ground surface when said hoist platform is subsequently lowered, whereby said jack members are shifted upwardly to project said axle receiving elements against vehicle axle and raise the same to elevate the vehicle wheels above the hoist platform, and means for maintaining said wheels in elevated position when said hoist is subsequently raised.

4. A wheel elevating attachment for vehicle hoists of the type having a pair of raisable spaced parallel vehicle carrying tracks said attachment comprising a supporting frame traversing the hoist tracks and supported thereon, a pair of vertically disposed spaced sleeve members supported from intermediate portions of said transverse frames, a pair of vertically disposed jack members respectively mounted in said sleeves in slidable relation thereto and having a substantial portion thereof extending below said tracks for engagement with the ground surface when said tracks are lowered, said jack members being adapted to be placed under the axle of a vehicle when said tracks are slightly raised and thereafter raising said axle when said hoist is subsequently lowered to elevate the wheels carried by said axle above the tracks, and means for maintaining said vertically disposed jack members in raised position.

5. A wheel elevating attachment for vehicle hoists of the type having a pair of raisable spaced parallel vehicle carrying tracks, a supporting bridge adapted to traverse said tracks and having the marginal end portions supported thereon in longitudinally shiftable relation to said tracks, a pair of vertically disposed spaced sleeve members slidably mounted on intermediate portions of said bridge for sliding movement transversely of said tracks, a pair of vertically disposed jack members respectively slidably mounted in said sleeves, said members being adapted to be placed at a selected point directly under the axle of a vehicle carried on said tracks when said tracks have been slightly raised, said jack members engaging the ground surface to be projected upwardly and raise the vehicle axle when said tracks are subsequently lowered, and means for holding said jack members in upwardly projected position when said tracks are subsequently raised.

6. A wheel elevating attachment for vehicle hoists of the type having a pair of raisable spaced parallel vehicle carrying tracks, said attachment having in combination an extensible carriage adapted to traverse said tracks and to be adjusted to fit between tracks having various spacings therebetween, said extensible carriage comprising a plurality of longitudinally aligned elongated elements and means for interconnecting adjacent ends of said elements with provision for adjustably fixing the relation between said adjacent ends to vary the length of said carriage, a pair of vertically disposed spaced sleeve members slidably mounted on intermediate portions of said carriage for sliding movement transversely of said hoist tracks, a pair of vertically disposed jack members slidably mounted on said sleeves and extending below said tracks to engage the ground surface and be projected upwardly when said tracks are lowered, said members being adapted to be placed at a desired point transversely between said tracks in a selected position directly below the axle of a vehicle carried on said tracks when said tracks are in slightly raised position, the upper projection of said members when said tracks are subsequently lowered raising the vehicle axle and the wheels carried thereon, and releasable means for securely holding said jack members in upwardly projected position.

7. A wheel elevating attachment for vehicle hoists of the type having a pair of raisable spaced parallel vehicle carrying tracks, said attachment comprising a supporting frame traversing said tracks and supported thereon, a pair of vertically disposed sleeve members supported from intermediate portions of said transverse frame, a pair of vertically disposed jack members slidably mounted in said sleeves and having a plurality of horizontally disposed vertically spaced apertures formed therein, a ground engaging element fixed to each of said jack members and normally disposed below said tracks for engaging the ground surface and projecting said jack members upwardly when said tracks are lowered, said jack members being adapted to be placed under the axle of a vehicle when said hoist is slightly raised with a vehicle carried thereon, a subsequent lowering of said hoist projecting said jack members upwardly to raise the vehicle axle to elevate the wheels carried by said axle above said tracks and a stop pin adapted to be selectively received in one of said jack member apertures to be supported by said frame when said hoist is subsequently raised and maintain said jack members in upwardly projected position.

ROY E. JOHNSON.

REFERENCES CITED

The following references are of record in the file of this patent:

UNITED STATES PATENTS

| Number | Name | Date |
|---|---|---|
| 1,915,024 | Logette et al. | June 20, 1933 |
| 2,229,113 | Mizer | Jan. 21, 1941 |